GETTERING IN SEMICONDUCTOR DEVICES

Filed May 7, 1963

INVENTORS
Steward S. Flaschen
Marie A. Hall
BY
Mueller & Aichele
ATTY'S.

United States Patent Office 3,259,490

Patented July 5, 1966

3,259,490

GETTERING IN SEMICONDUCTOR DEVICES

Steward S. Flaschen, Phoenix, and Marie A. Hall, Scottsdale, Ariz., assignors to Motorola, Inc., Chicago, Ill., a corporation of Illinois Filed May 7, 1963, Ser. No. 278,565
3 Claims. (Cl. 75—134)

This invention relates to moisture gettering within semiconductor enclosures and more particularly to a gettering material which may be applied to semiconductor devices in the form of a solder.

Moisture getters of the adsorbent type, e.g., molecular sieve, and reactive moisture getters, e.g., barium oxide and other oxides, have been known and used to scavenge excess moisture from semiconductor device encapsulations in order to improve the characteristics of the devices. These getters are usually encapsulated within the enclosure of a semiconductor device in the form of a powder or as granules. Powdered and granular getters are sometimes considered objectional because they are usually loose within the enclosure. The getter material is free to move around, and in some instances damage may be done to the device by mechanical or other action by getter particles on critical regions of the device.

Another getter, but one which is not normally free to move around, is a sintered pellet of a powdered metal and barium oxide. This pellet may be mechanically attached within the device container. Sintered materials, however, occasionally crumble or disintegrate when subjected to shock and vibration.

Although each of the described materials are very useful, their objectional features, as noted, render them unsuitable for many applications where extreme reliability is required.

The present invention obviates the above disadvantages of the prior art.

One of the objects of the present invention is to provide an adequate getter material which may be readily and permanently fixed in a given position.

Another object is to provide a getter material which has the structural strength to withstand shock and vibration beyond the point where the semiconductor device may be expected to fail for other reasons.

A feature of this invention is the incorporation of gettering materials into a fusible solder-like getter which may be fastened to semiconductor components by soldering.

Figure 1:
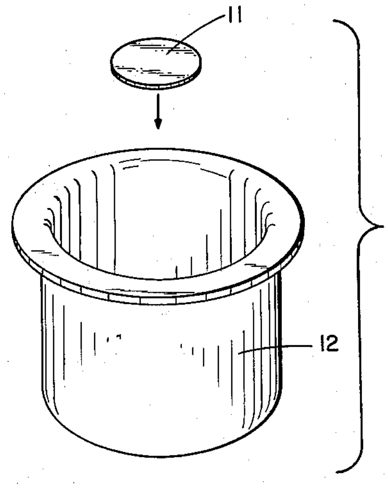
Figure 2:
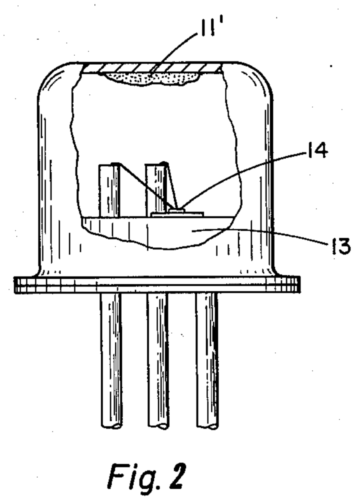

In the accompanying drawings, FIG. 1 and FIG. 2 show how the getter is mounted within a semiconductor enclosure.

The fusible getter of this invention is prepared as a binary alloy by melting together a readily fusible metal such as bismuth and an active metal such as barium. A ternary alloy is prepared by melting bismuth, and an active metal such as barium, together with lead. In each case, the presence of bismuth permits a lower melting temperature and improves the soldering characteristics of the alloys.

The fusible getter may be rolled out and prepared in the form of solder preforms so that the material may be readily fastened to a semiconductor device container in a soldering operation preferably in an operation just prior to enclosure. FIG. 1 shows a getter preform 11 being dropped into place in a transistor cap or can 12. The can 12 and getter 11 are soldered together by the melted getter material and after solidification and cooling the getter is activated by allowing the barium to oxidize at room temperature in air for 10 minutes or more at a relative humidity of 20% or less to form barium oxide on the surface. FIG. 2 shows in a cutaway view, the getter 11' soldered to the can 12 and after the can has been welded onto the header 13 containing a semiconductor transistor element 14.

After the transistor element is enclosed with a can, water vapor within the enclosure which reaches the getter reacts with the barium oxide and the water is removed from the enclosed atmosphere as a result of the reaction:

$$H_2O + BaO \rightarrow Ba(OH)_2$$

While the getter material is reactive in air at room temperature, the getter may be exposed to such conditions at a relative humidity below 20% for several days without detrimental effect since BaO continues to form to replace that lost in forming $Ba(OH)_2$. This apparent slowness of action is of little consequence within the enclosure as the moisture bearing volume is relatively small so that reasonably complete gettering occurs in a relatively short period of time and additionally semiconductor devices are usually put through a heating cycle to stabilize them and this speeds up the rate at which gettering occurs.

In many cases, the soldering temperature for the getter is satisfactory for other soldering operations so that the getter may be applied during a regular soldering assembly operation and then fused to the device in a pass through a soldering furnace.

A range of minimum soldering temperatures in the binary alloy is available depending on the composition of the binary and ternary alloys. In the binary alloy, the barium content can range from 2 to 20 percent with a corresponding melting temperature range of from 420° C. to 470° C.

In the ternary alloy the barium content is 8 to 10 percent, the bismuth content ranges from 45 to 47 percent, the lead content from 43 to 45 percent. The minimum soldering temperature range of the ternary alloy varies only slightly from an approximate melting point of 450° C. due to the small tolerance in material proportions.

Since the getter contains the active element barium, if the atmosphere within the enclosure is to contain a given percentage of oxygen, then the barium should be allowed to completely oxidize to BaO or else provision should be made for loss of oxygen by the reaction within the barium.

The solder getter as described is convenient and inexpensive to use with a major advantage being that it is fixed in position and therefore cannot contribute to device failure during shock and vibration as can loose or frangible adsorbents.

What is claimed is:

1. A moisture getter of fusible solder-like material for use in a sealed enclosure, said moisture getter including in combination an alloy of the metals barium, bismuth and lead, said alloy containing at least 45% bismuth.

2. A moisture getter of fusible material for use in a sealed enclosure, said getter including in combination an alloy of at least 45% bismuth metal and from 2% to 20% barium metal.

3. A moisture getter of fusible material for use in a sealed enclosure, said getter including in combination an alloy of from 45% to 47% bismuth metal, from 43% to 45% lead metal, and from 8% to 10% barium metal.

References Cited by the Examiner

UNITED STATES PATENTS

| | | | |
|---|---|---|---|
| 1,428,041 | 9/1922 | Kroll | 75—167 |
| 1,623,351 | 4/1927 | McRae | 252—181.6 X |
| 1,861,643 | 6/1932 | Pirani | 252—181.6 X |
| 2,018,965 | 10/1935 | McQuade | 252—181.6 X |
| 2,072,342 | 3/1937 | McMaster et al. | 313—179 |
| 2,855,368 | 10/1958 | Perdijk | 252—181.6 |
| 3,007,089 | 10/1961 | King | 317—234 |
| 3,083,320 | 3/1963 | Godfrey et al. | 313—179 X |

FOREIGN PATENTS

| | | |
|---|---|---|
| 140,790 | 11/1920 | Great Britain. |
| 45,672 | 10/1928 | Norway. |

ROBERT K. SCHAEFER, *Primary Examiner.*

JOHN P. WILDMAN, JOHN F. BURNS, *Examiners.*

W. B. FREDRICKS, J. F. RUGGIERO, *Assistant Examiners.*